United States Patent Office 2,904,599
Patented Sept. 15, 1959

2,904,599

PRODUCTION OF MONOCHLOROCYCLO-PENTADIENE

Morton Kleiman, Chicago, and John C. Tapas, Evanston, Ill., assignors to Velsicol Chemical Corporation, a corporation of Illinois No Drawing. Application August 17, 1954
Serial No. 450,554

3 Claims. (Cl. 260—648)

This invention relates to a new composition of matter and to methods for its production. More specifically, the present invention relates to the production of monochlorocyclopentadiene.

The product of the present invention is useful in the preparation of novel insecticidal compounds, unusual organic chemicals, organic polymers and copolymers.

For example, monochlorocyclopentadiene is useful in the preparation of an insecticidally active heptachloromethanoindene. This insecticide would ordinarily be prepared by substitution of a single chlorine atom into the cyclopentene ring of the Diels-Alder adduct of cyclopentadiene and hexachlorocyclopentadiene. This monochlorinated adduct has many times the insecticidal toxicity of the intermediate adduct and is considerably more active than the product obtained by addition of two chlorine atoms to the above adduct. This substitution product described above may be prepared by various chemical means, including catalytic chlorination using chlorine, but these processes are either expensive or produce a mixture of side products in conjunction with the desired heptachloro compound, necessitating extensive recrystallizations to produce the pure material. To eliminate chemical processing and purification after the product has been made, it is desirable that the product be prepared in substantially pure form and in high yield by simple adduction without the use of special reagents and reactants.

Several methods are known for the chlorination of cyclopentadiene. These methods are respectively treatment of cyclopentadiene with aqueous alkaline hypochlorite in a two-phase system, and chlorination with gaseous chlorine of cyclopentadiene in the liquid phase. In the process involving hypochlorite, cyclopentadiene is emulsified in aqueous sodium hypochlorite for several hours and ultimately produces hexachlorocyclopentadiene and smaller amounts of pentachlorocyclopentadiene and tetrachlorocyclopentadiene. Products containing less than four chlorine atoms have not been isolated from the reaction mixture and no known method exists by which it is possible to produce and isolate monochlorocyclopentadiene using this process.

When cyclopentadiene in the liquid phase is treated with gaseous chlorine, the chlorine adds across the double bonds to produce dichlorocyclopentene and tetrachlorocyclopentane. This process, of course, saturates the double bonds and destroys the utility of the material as a diene in the Diels-Alder synthesis. Monochlorocyclopentadiene has never been isolated from the product of this chlorination method.

Monochlorocyclopentadiene is exceedingly reactive and polymerizes readily with itself in contrast with the more highly chlorinated hexachlorocyclopentadiene which is stable even at elevated temperatures.

Since the product of the present invention has two conjugated double bonds it will readily undergo Diels-Alder additions to numerous dienes and dienophiles among which are maleic anhydride, ethylene, acetylene dicarboxylic acid, cyclopentadiene, cyclopentene, and butadiene.

The reactive double bonds of the present product render the material useful in the preparation of polymers and copolymers by addition polymerization.

It has been discovered that the product of the present invention may be prepared by pyrolysis and consequent dehydrohalogenation of a dichlorocyclopentene. The dichlorocyclopentene starting material is readily prepared by the low temperature chlorination of cyclopentadiene in acetic acid-chloroform solvent. Other solvents can likewise be employed.

The pyrolysis of the dichlorocyclopentene is carried out in a continuous process by passing vaporized dichlorocyclopentene through a bed of heated contact material or cracking zone at the requisite temperature, contained for convenience for example in a vertical chamber. To maintain a flow of raw material through said heated bed or cracking zone it is necessary to sweep the vapors of starting material through the reaction zone with a stream of inert gas which may be at atmospheric or mildly superatmospheric pressures, or by merely maintaining a pressure head of starting material vapors as is conventional in the cracking art. The time required for conversion of dichlorocyclopentene to monochlorocyclopentadiene varies in an inverse manner with the temperature of the cracking zone. Thus, at more elevated temperatures a shorter period of time is required to complete the conversion to monochlorocyclopentadiene, and at lower temperatures the time necessary is correspondingly increased. In general, temperatures from about 300° C. to about 575° C. are operable and temperatures from about 325° C. to about 550° C. are preferred. The time necessary for pyrolysis varies from about 5 to 10 seconds at 575° C. to from about 12 to 40 seconds at 300° C. In the preferred range of temperatures about 15 to 25 seconds are suitable at about 325° C. and about 6 to 8 seconds are suitable at about 550° C.

Pressure is not a critical feature of the present invention, and as aforesaid, one may use an inert gas or mildly superatmospheric pressures to sweep the vapors through the apparatus utilized, or, if desired, the reaction may be run at slightly subatmospheric pressures maintaining a pressure differential between the entrance to the cracking zone and the efflux point, with or without the use of an inert gas such as nitrogen.

Monochlorocyclopentadiene prepared as by the aforesaid pyrolytic process from dichlorocyclopentene is highly reactive material and tends to spontaneously polymerize when stored at normal room or more elevated temperatures. Because of this property the effluent stream from the cracking zone containing monochlorocyclopentadiene and other materials is collected in a receiver maintained at low temperatures such as, for example, between about 0° C. and −40° C. or lower. This low temperature inhibits polymer formation, and degradation of the product is held to a minimum. While rapid distillation of the crude product to separate pure monochlorocyclopentadiene does not appreciably affect the product in an adverse way, storage for an extended period should be at the low temperatures previously described. While the contact material in the specific example of pyrolysis was of a ceramic type (Berl saddles), any inert packing material will be satisfactory provided it is of sufficient size to permit ready flow of the reactant. If desired, no packing material need be used and instead a constricted heated zone may be employed as, for example, a section of pipe where temperature may be readily controlled.

The following examples will illustrate the preparation of the starting material and the product of the present invention:

Example I

Preparation of dichlorocyclopentene: Into a 3-necked flask equipped with a Dry Ice condenser, thermometer, stirrer and gas inlet sparger was placed two moles (120 grams) of glacial acetic acid and 200 grams of chloroform. The contents of the flask were cooled to −60° C. and two moles of cyclopentadiene (132 grams) was added. To the above chilled reaction mixture was added two moles of gaseous chlorine in a portionwise manner. The temperature of the reaction mixture was maintained at −30° C. by controlling the rate of addition of chlorine. When all of the chlorine had been added, the temperature of the reaction mixture was allowed to rise to −20° C. over a two-hour period. The reaction mixture was then poured into cold water and extracted with ether. The ether solution was washed several times with water and a 5% $Na_2CO_3$ solution and dried over dry potassium carbonate at 25° C. The ether solvent was removed by evaporation and the product distilled under reduced pressure. The major fraction boiling at 38–40° C. at 0.5 Hg pressure was removed. The refractive index of this fraction was $n_D^{20}$ 1.5067 with Amichi prism readings of 20.8. A sample purified by distillation had a refractive index of 1.5100 with Amichi prism reading of 20.8 and boiling point of 46° C. at 3.0 mm. of Hg pressure.

Dichlorocyclopentene prepared in Example I may be converted by pyrolysis and consequent dehydrohalogenation into monochlorocyclopentadiene. The following experiment will illustrate specifically a method of preparing monochlorocyclopentadiene:

Example II

The pyrolysis chamber used in this experiment was a vertically aligned Pyrex tube of 19 mm. diameter. The heated contact zone of about 80 cm. in length was filled with 450 cc. of contact material (¼-inch Berl saddles) and about ⅓ of the distance from the lower or effluent end of the tube was a layer of about 25 grams of 4 mesh calcium sulfate. The tube was heated to 393° C. by means of two jacket type electric combustion furnaces. Dichlorocyclopentene (0.5 mole; 66 grams) was introduced at a rate of about 1 liquid cc. per minute. Total pyrolysis time was 15 seconds. Forty-five grams of crude product was collected at the low end of the tube in a Dry Ice-acetone chilled receiver. The crude product was fractionated under vacuum and the fraction boiling at 25° C. and 10 mm. Hg pressure was collected in a chilled receiver. The product had the following elementary analysis:

|  | C | H | Cl |
|---|---|---|---|
|  | Percent | Percent | Percent |
| Calculated for $C_5H_5Cl$ | 59.72 | 5.01 | 35.26 |
| Found for product | 59.09 | 5.17 | 34.69 |

The monochlorocyclopentadiene prepared in Example II is useful in the preparation of an insecticidal heptachloromethanoindene as previously described. The following example specifically illustrates the preparation of this material from monochlorocyclopentadiene:

Example III

Into a 200 ml., 3-necked flask equipped with an efficient stirrer, thermometer, and a reflux condenser was placed 0.365 mole plus a 5% excess (104.5 g.) of hexachlorocyclopentadiene. The system was flushed with nitrogen and 0.365 mole (36.7 g.) of monochlorocyclopentadiene was added in a dropwise manner to the contents of the flask maintained at 76° C. During the addition comprising about two hours the reaction mixture was maintained at a temperature between about 76° C. and 81° C., and after the addition was complete the reaction mixture was heated at 76° C. for an additional hour. Unreacted hexachlorocyclopentadiene was removed from the reaction mixture by vacuum fractional distillation. The residue was twice crystallized from pentane. Crystals of product recovered melted at 68–69° C. and had the following elementary analysis:

|  | C | H | Cl |
|---|---|---|---|
|  | Percent | Percent | Percent |
| Calculated for $C_{10}H_5Cl_7$ | 32.17 | 1.35 | 66.48 |
| Found for product | 32.41 | 1.25 | 66.27 |

The product prepared in Example III was found to be insecticidally active to a high degree. The insecticide thus prepared is soluble in common organic solvents and may be applied to insect pests in the form of solvent solutions, fogs, baits, aqueous emulsions, dusts, and the like.

We claim:

1. The method of preparing monochlorocyclopentadiene which comprises passing vaporized dichlorocyclopentene, prepared by the low temperature chlorination of cyclopentadiene in a solvent, in a confined stream through a heating zone maintained at a temperature between about 300° C. to about 575° C. in a period of time varying inversely with the temperature of from about 5 seconds to about 40 seconds, collecting said reaction stream at a temperature between about 0° C. and about −40° C., and recovering monochlorocyclopentadiene therefrom.

2. The method of preparing monochlorocyclopentadiene which comprises passing a stream of vaporized dichlorocyclopentene, prepared by the low temperature chlorination of cyclopentadiene in a solvent, through a bed of contact material in a heated zone maintained at a temperature between about 300° C. and 575° C. in a period of time varying inversely with the temperature of from about 5 seconds to about 40 seconds, collecting and condensing the heated reaction products therefrom and separating a fraction containing 5-chloro-1,3-cyclopentadiene from the condensate as the reaction product of the process.

3. The method of preparing monochlorocyclopentadiene which comprises passing a stream of vaporized dichlorocyclopentene, prepared by the low temperature chlorination of cyclopentadiene in a solvent, through a bed of contact material in a heated zone maintained at a temperature between about 325° C. and 550° C. in a period of time varying inversely with the temperature of from about 6 seconds to about 25 seconds, collecting and condensing the heated reaction products therefrom and separating monochlorocyclopentadiene from the condensate as the reaction product of the process.

References Cited in the file of this patent

UNITED STATES PATENTS

| 2,391,827 | Hearne et al. | Dec. 25, 1945 |
| 2,576,666 | Bluestone et al. | Nov. 27, 1951 |
| 2,598,561 | Kleiman | May 27, 1952 |
| 2,631,171 | Newcomer | Mar. 10, 1953 |
| 2,650,942 | Maude et al. | Sept. 1, 1953 |

OTHER REFERENCES

Sabatier et al.: "Comptes Rendus," vol. 137, pp. 240–2 (1903).

Strauss et al.: "Ber. der deut. chem. Gesell.," vol. 63, p. 1870 (1930).